(12) United States Patent
Herbert et al.

(10) Patent No.: US 8,260,459 B2
(45) Date of Patent: Sep. 4, 2012

(54) ROBOTIC VEHICLE SYSTEM

(75) Inventors: Sammuel D. Herbert, Woodbury, MN (US); Nikolaos P. Papanikolopoulos, Minneapolis, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 579 days.

(21) Appl. No.: 12/463,067

(22) Filed: May 8, 2009

(65) Prior Publication Data
US 2010/0076598 A1  Mar. 25, 2010

Related U.S. Application Data

(60) Provisional application No. 61/126,865, filed on May 8, 2008.

(51) Int. Cl.
*G06F 19/00* (2011.01)
(52) U.S. Cl. ........................................................ 700/245
(58) Field of Classification Search .................. 700/245
See application file for complete search history.

(56) References Cited

U.S. PATENT DOCUMENTS

| | | | |
|---|---|---|---|
| 1,408,885 A | 3/1922 | Humphrey | |
| 2,400,824 A | 5/1946 | Jackson | |
| 2,818,301 A | 12/1957 | Hayden | |
| 3,058,754 A * | 10/1962 | Whitaker | 280/5.26 |
| 3,208,544 A | 9/1965 | Colvin | |
| 3,241,848 A | 3/1966 | Flory | |
| 3,283,839 A | 11/1966 | Brown et al. | |
| 3,348,518 A | 10/1967 | Forsyth et al. | |
| 4,264,082 A * | 4/1981 | Fouchey, Jr. | 280/5.26 |
| 4,300,308 A | 11/1981 | Ikeda | |
| 4,334,221 A | 6/1982 | Rosenhagen et al. | |
| 4,402,158 A | 9/1983 | Seki et al. | |
| 4,406,085 A | 9/1983 | Rhodes | |
| 4,443,968 A | 4/1984 | Law | |
| 4,572,530 A | 2/1986 | Marino | |
| 4,575,304 A | 3/1986 | Nakagawa et al. | |
| 4,648,853 A | 3/1987 | Siegfried | |
| 4,674,757 A * | 6/1987 | Martin | 280/5.26 |
| 4,736,826 A | 4/1988 | White et al. | |
| 4,773,889 A | 9/1988 | Rosenwinkel et al. | |
| 4,899,945 A | 2/1990 | Jones | |
| 4,906,051 A | 3/1990 | Vilhauer, Jr. | |
| 4,913,458 A | 4/1990 | Hamilton | |
| 4,919,489 A * | 4/1990 | Kopsco | 301/44.4 |
| 4,993,912 A | 2/1991 | King et al. | |

(Continued)

FOREIGN PATENT DOCUMENTS

GB  2194457 A  3/1988

(Continued)

OTHER PUBLICATIONS

Osipov et al., "Mobile robots for security," *Proceedings of the 1996 2nd Specialty Conference on Robotics for Challenging Environments*, RCE-II, Albuquerque, NM, 1996; 290-295.

(Continued)

*Primary Examiner* — James Trammell
*Assistant Examiner* — Michael D Lang
(74) *Attorney, Agent, or Firm* — Mueting Raasch & Gebhardt, P.A.

(57) ABSTRACT

Robotic vehicle systems and methods regarding such systems, such as, e.g., methods of movement for such robotic vehicle systems (e.g., movement across varying terrain including steps).

20 Claims, 8 Drawing Sheets

U.S. PATENT DOCUMENTS

| | | | |
|---|---|---|---|
| 5,129,709 | A | 7/1992 | Klamer |
| 5,241,380 | A | 8/1993 | Benson et al. |
| 5,350,033 | A | 9/1994 | Kraft |
| 5,473,364 | A | 12/1995 | Burt |
| 5,487,692 | A | 1/1996 | Mowrer et al. |
| 5,551,545 | A | 9/1996 | Gelfman |
| 5,554,914 | A | 9/1996 | Miyazawa |
| 5,576,605 | A | 11/1996 | Miyazawa |
| 5,596,255 | A | 1/1997 | Miyazawa |
| 5,610,488 | A | 3/1997 | Miyazawa |
| 5,721,691 | A | 2/1998 | Wuller et al. |
| 5,732,074 | A | 3/1998 | Spaur et al. |
| 5,759,083 | A | 6/1998 | Polumbaum et al. |
| 5,762,533 | A | 6/1998 | Tilbor et al. |
| 5,839,795 | A | 11/1998 | Matsuda et al. |
| 5,888,135 | A | 3/1999 | Barton, Jr. et al. |
| 5,908,454 | A | 6/1999 | Zyburt et al. |
| 6,046,565 | A | 4/2000 | Thorne |
| 6,066,026 | A | 5/2000 | Bart et al. |
| 6,101,951 | A | 8/2000 | Sigel |
| 6,109,568 | A | 8/2000 | Gilbert et al. |
| 6,199,880 | B1 | 3/2001 | Favorito et al. |
| 6,322,088 | B1 | 11/2001 | Klamer et al. |
| 6,502,657 | B2 | 1/2003 | Kerrebrock et al. |
| 6,548,982 | B1 | 4/2003 | Papanikolopoulos et al. |
| 6,574,536 | B1 | 6/2003 | Kawagoe et al. |
| 6,860,346 | B2 | 3/2005 | Burt et al. |
| 7,011,171 | B1 * | 3/2006 | Poulter .......................... 180/8.2 |
| 7,559,385 | B1 | 7/2009 | Burt et al. |
| 2003/0137268 | A1 | 7/2003 | Papanikolopoulos et al. |
| 2004/0000439 | A1 | 1/2004 | Burt et al. |
| 2006/0174989 | A1 * | 8/2006 | Jones ........................... 152/246 |
| 2007/0075509 | A1 * | 4/2007 | Wyrick, III ................ 280/47.27 |
| 2008/0143065 | A1 * | 6/2008 | DeFazio et al. .............. 280/5.28 |
| 2010/0001478 | A1 * | 1/2010 | De Fazio et al. ............. 280/5.28 |

FOREIGN PATENT DOCUMENTS

| | | |
|---|---|---|
| JP | 63-269701 | 11/1988 |
| JP | 10-69314 | 3/1998 |

OTHER PUBLICATIONS

PackBot, iRobot, product description, Milford, NH; 3 pgs.

Papanikolopoulos, Nikolaos, CISE Research Resources: Teams of Miniature Mobile Robots, Award Abstract, Award No. 0224363 [online]. National Science Foundation, project dates Nov. 1, 2002 to Oct. 31, 2005 [retrieved on Feb. 18, 2004]. Retrieved from the Internet: <URL:https://www.fastlane.nsf.gov/servlet/showaward?award=0224363>; 3 pgs.

Papanikolopoulos, Nikolaos, ITR: Collaborative Research: Multi-Robot Emergency Response, Award Abstract, Award No. 0324864 [online]. National Science Foundation, project dates Sep. 15, 2003 to Aug. 31, 2007 [retrieved on Nov. 18, 2005]. Retrieved from the Internet: <URL:http://www.nsf.gov/awardsearch/showAward.do?AwardNumber=0324864>; 2 pgs.

Parker, "On the design of behavior-based multi-robot teams," *Advanced Robotics*, 1996; 10(6):547-578.

Pellerin, "Twenty-first Century Sentries," *Industrial Robot*, 1993; 20(2):15-17.

Porteous, "Intelligent Buildings and Their Effect on the Security Industry," *Proceedings of the Institute of Electrical and Electronics Engineers, 29th Annual, 1995 International Carnahan Conference on Security Technology*, Sanderstead, Surrey, England, Oct. 18-20, 1995; 186-188.

Pritchard et al., "Test and Evaluation of Panoramic Imaging Security Sensor for Force Protection and Facility Security," *Proceedings of the Institute of Electrical and Electronics Engineers, 32nd Annual, 1998 International Carnahan Conference on Security Technology*, Alexandria, VA, Oct. 12-14, 1998; 190-195.

Quinn et al., "Insect Designs for Improved Robot Mobility", Proceedings of the 4th International Conference on Climbing and Walking Robots, Berns and Dillmann eds., Prof. Eng. Pub., 2001, pp. 69-76.

Albert et al., "Detection of Stair Dimensions for the Path Planning of Biped Robot", 2001 IEEE/ASME Intl. Conf. On Advanced Intelligent Mechatronics Proceedings. Jul. 8-12, 2001—Como, Italy. pp. 1291-1296.

Allen et al., "Abstract Biological Principles Applied with Reduced Actuation Improve Mobility of Legged Vehicles", Proceedings of the 2003 IEEE/RSJ. International Conference on Intelligent Robots and Systems. Las Vegas, Nevada. Oct. 2003. 6 pages.

Balch et al., "Behavior-based Formation Control for Multi-robot Teams," *IEEE Transactions on Robotics and Automation*, 1998; 14(6):1-15.

Burgard et al., "Collaborative Multi-Robot Exploration," *IEEE International Conference on Robotics and Automation (ICRA)*, 2000; 5 pgs.

Boxerbaum et al., "Design of an Autonomous Amphibious Robot for Surf Zone Operation: Part I Mechanical Design for Multi-Mode Mobility", Proceedings of the 2005 IEEE/ASME International Conference on Advanced Intelligent Mechatronics. Monterey, CA. USA Jul. 24-28, 2005. 6 pages.

Campbell et al., "Stair Descent in the Simple Hexapod 'Rhex'", Proceedings of the 2003 IEEE International Conference on Robotics & Automation. Taipei, Taiwan. Sep. 2003. 6 pages.

Cao et al., "Cooperative Mobile Robotics: Antecedents and Directions," *Autonomous Robots*, 1997; 4:7-27.

Carlson et al., "Design Considerations for a Multi-Robot Team Carrier", Proceedings of the 2006 International Conference on Robotics and Automation. 2006. 3 pages.

Carts-Powell, "Spring-loaded spies," [online]; *New Scientist*, retrieved from the Internet on Jan. 4, 2000 at: <URL:www.newscientist.com/ns/19991113/newsstory1.html>, 3 pgs.

Chemel et al., "Cyclops: Miniature Robotic Reconnaissance System," *Proceedings of the 1999 IEEE International Conference on Robotics & Automation*, May 1999, Detroit, MI; 2298-2302.

Clocky, MSNBC, "Hit snooze and this alarm clock runs and hides," [online]; Updated Mar. 22, 2005, retrieved from the Internet on Dec. 10, 2005 at: <URL:www.msnbc.msn.com/id/7268066/>, 3 pgs.

Clocky™, [online]; retrieved from the Internet on Dec. 2, 2005 at: <URL:www.clocky.net/html>; website available at least as early as Mar. 25, 2005, 1 pg.

Dalvand et al., "Stair Climber Smart Mobile Robot (MSRox)," *Autonomous Robots*, vol. 20:3-14. 2006.

Defense Advanced Research Projects Agency (DARPA), "Distributed Robotics," [online]; retrieved from the Internet on Jan. 4, 2000 at: <URL:www.darpa.mil/MTO/DRobotics/index.html>, 2 pgs.

Defense Advanced Research Projects Agency (DARPA), "Distributed Robotics Using Reconfigurable Robots," [online]; retrieved from the Internet on Jan. 4, 2000 at: <URL:www.darpa.mil/MTO/DRobotics/98DROverviews/university-10.html>, 2 pgs.

Dillmann et al., "PRIAMOS: An Advanced Mobile System for Service, Inspection, and Surveillance Tasks," *Modelling and Planning for Sensor Based Intelligent Robot Systems*, vol. 21 of *Series in Machine Perception and Artificial Intelligence*, World Scientific, Singapore; 1995, 22 pgs.

Drenner et al., "Mobility Enhancements to the Scout Robot Platform," *Proceedings of the 2002 IEEE International Conference on Robotics and Automation*, Washington, DC, May 11-15, 2002, 1069-1074.

Drenner et al., "Communication and Mobility Enhancements to the Scout Robot," *Proceedings of the 2002 IEEE/RSJ International Conference on Intelligent Robots and Systems*, EPFL Lausanne, Switzerland, Sep. 30-Oct. 4, 2002; 1:865-870.

Drenner et al., "Increasing the Scout's Effectiveness Through Local Sensing and Ruggedization," *Proceedings of the 2004 IEEE International Conference on Robotics and Automation*, Apr. 2004, New Orleans, LA, 1406-1411.

Eisler et al., "Cooperative Control of Vehicle Swarms for Acoustic Target Recognition by Measurement of Energy Flows," Sandia National Laboratories, manuscript received Feb. 1, 2002, Albuquerque, NM; 4 pgs.

Elfes, "Using Occupancy Grids for Mobile Robot Perception and Navigation," *IEEE Computer*, 1989; 22(6):46-57.

Everett et al., "From Laboratory to Warehouse: Security Robots Meet the Real World," *International Journal of Robotics Research*, 1999; 18(7):760-768.

Feddema et al., "Decentralized Control of Cooperative Robotic Vehicles: Theory and Application," *IEEE Transactions on Robotics and Automation*, 2002; 18(5):852-864.

Fox et al., "Collaborative Multi-Robot Localization", *Proc. of the German Conference on Artificial Intelligence (KI)*, Germany; date unknown; 12 pgs.

Fox et al., "A Probabilistic Approach to Collaborative Multi-Robot Localization," *Autonomous Robots*, 2000; 8(3):325-344.

Gerkey et al., "Most Valuable Player: A Robot Device Server for Distributed Control", Proceedings of the 2$^{nd}$ Annual International Workshop on Infrastructure for Agents, MAS and Scalable MAS in Autonomous Agents. Montreal, Canada. May 29, 2001. 6 pages.

Gerkey et al., "The Player/Stage Project: Tools for Multi Robot Distributed Sensor Systems", Proceedings of the International Conference on Advanced Robotics. (ICAR 2003). Jun. 30-Jul. 3, 2003. Coimbra, Portugal. pp. 317-323.

Gutman et al., "Stair Climbing for Humanoid Robots Using Stereo Vision", Proceedings of the 2004 Intl. Conf. on Intelligent Robots and Systems, Sep. 28-Oct. 2, 2004. Sendal, Japan.

Helmick et al., "Multi-Sensor, High Speed Autonomous Stair Climbing", Proceedings of the 2002 International Conference on Intelligent Robots and Systems, 2002. 10 pages.

Herbert et al., "Loper: A Quadruped-Hybrid Stair Climbing Robot", ICRA '08 Paper Abstract. 2008 IEEE Robotics and Automation Society. 1 page.

Herbert et al., "Loper: A Quadruped-Hybrid Stair Climbing Robot", 2008 IEEE International Conference on Robotics and Automation. Pasadena, CA. May 12-23, 2008. pp. 799-804.

Hirai et al., "The Development of Honda Humanoid Robot", Proceedings of the 1998 IEEE International Conference on Robotics and Automation. May 1998, Leuven, Belgium. 6 pages.

Hirose et al., "The TAQT carrier: A practical terrain adaptive quadrutrack carrier robot," Proceedings of the 1992 IEEE/RSJ Intl. Conf. on Intelligent Robots and Systems, Raleigh, N.C. Jul. 7-10, 1992. pp. 2068-2073.

Howstuffworks "How Military Robots Work", Retrieved from internet at http://science.howstuffworks.com/military-robot3 on Jan. 5, 2008 at 3:41 pm. 2 pages.

Jacovich, Marissa L. Thesis. "Design of a Stair Climbing Hand Truck", Submitted to the Department of Engineering in partial fulfillment of the requirements for the degree of Bachelor of Science in Mechanical Engineering at Massachusetts Institute of Technology (MIT). Jun. 8, 2005. 49 pages.

Kajiwara et al., "Development of a Mobile Robot for Security Guard," *Proceedings of the 15th Intl. Symposium on Industrial Robots*, Tokyo, Japan, 1985; 1:271-278.

Kochan, "HelpMate to ease hospital delivery and collection tasks, and assist with security," *Industrial Robot*, 1997; 24(3):226-228.

Mataric, "Behaviour-based control: examples from navigation, learning, and group behaviour," *J. Expt. Theor. Artif. Intell.*, 1997; 9:323-336.

Matthies et al., "A Portable, Autonomous, Urban Reconnaissance Robot, Robotics and Autonomous Systems", 2002. 40:163-172.

Moore et al., "Reliable Stair Climbing in the Simple Hexapod 'Rhex'", Proceedings of the 2002 IEEE International Conference on Robotics & Automation. 2002. 7 pages.

Money et al., "Highly Mobile and Robust Small Quadruped Robots", Proceeding of the 2003 IEEE International Conference on Robotics and Systems. 2003.

Nakamura et al., "Team Description of the RoboCup-NAIST," RoboCup-99 Team Descriptions, Middle Robots League, Team NAIST, 1999; 170-174.

Omnitech Robotics, "Toughbot," picture available at least as early as Mar. 22, 2005, 1 pg.

Orwig, "Cybermotion's Roving Robots," *Industrial Robot*, 1993; 20(3):27-29.

Rybski et al., "Enlisting Rangers and Scouts for Reconnaissance and Surveillance," *IEEE Robotics & Automation Magazine*, 2000; 14-24.

Sakagumi et al., "The Intelligent ASIMO: System Overview and Integration," Proceeding of the 2002 IEEE/RSJ International Conference on Intelligent Robotics and Systems. 2002. EPFL, Lausanne, Switzerland. Oct. 2002. pp. 2478-2483.

Saitoh et al., "A Mobile Robot Testbed with Manipulator for Security Guard Application," *Proc. of the IEEE Int'l Conference on Robotics and Automation*, Nagoya, Japan, 1995; 3:2518-2523.

Saranli et al., "Rhex: A Simple and Highly Mobile Hexapod Robot", International Journal of Robotics Research. 2001. vol. 20(7):616-631.

Schempf et al., "Pandora: Autonomous Urban Robotic Reconnaissance System," 1999 *IEEE*, May 1999, Detroit, MI; 2315-2321.

Spofford et al., "Collaborative robotic team design and integration," To appear in *Unmanned Ground Vehicle Technology II*, SPIE Proceedings vol. 4024, Orlando Fl, Apr. 2000; 12 pgs.

Stoeter et al., "Autonomous Stair Hopping with Scout Robots," Proceedings of the 2002 International Conference on Intelligent Robots and Systems. 2002. 6 pages.

Tri-star (wheel arrangement). Retrieved from the internet at http://en.wikipedia.org/wiki/Tri-star_(wheel_arrangement) on Jan. 5, 2008 at 3:30 pm. 1 page.

Tri-star wheeled vehicles. Infoimation retrieved from the internet at http://www.visi.com/_dc/tristar/bkground on Jan. 5, 2008 at 3:30 p.m. 3 pages.

Tri-star Wheel Project. Retrieved from the internet at_http://www.visi.com/-dc/tristar/index on Jan. 5, 2008 at 3:31 pm. 7 pages.

Weisbin et al., "Miniature Robots for Space and Military Missions," *IEEE Robotics and Automation Magazine*, 1999; 6(3):9-18.

Yim et al., "Modular Robots," *Robotics, IEEE Spectrum*, 2002; 30-34.

\* cited by examiner

600

# ROBOTIC VEHICLE SYSTEM

CONTINUING APPLICATION DATA

This application claims the benefit of U.S. Provisional Application Ser. No. 61/126,865, filed May 8, 2008, which is incorporated by reference herein.

STATEMENT OF GOVERNMENT RIGHTS

This work was supported in part by the National Science Foundation under Grant Number CNS-0324864. The government has certain rights in the invention.

BACKGROUND

The disclosure herein relates to robotic vehicle systems and methods regarding such systems, such as, e.g., methods of movement for such robotic vehicle systems (e.g., movement across varying terrain including steps).

Reconnaissance and surveillance are important activities for both military and civilian organizations alike. While by no means a complete list, hostage and survivor rescue missions, illicit drug raids, and response to chemical or toxic waste spills are some of the operations that may benefit from a reconnaissance or surveillance component.

While various systems may satisfactorily provide this capability, one promising solution is provided by the use of one or more robotic vehicle systems. These robotic vehicle systems, operating either autonomously, semi-autonomously, or under remote control, travel into areas deemed unsafe or otherwise unfriendly to humans and relay information back to remote personnel/equipment. While the exact configuration may vary, they typically include at least a chassis or body to carry the vehicle's payload and operational components (e.g., communication equipment, power supply, etc.), as well as powered ground-engaging members, e.g., wheels, to propel the vehicle over terrain. Using a variety of sensors associated with the body, these robotic vehicle systems may act as remote and mobile eyes, ears, noses, etc. of a reconnaissance/surveillance system.

Robotic vehicle systems may sometimes be required to move over various surfaces and/or obstacles, e.g., stairs. As such, different apparatus, methods, and/or systems have been previously devised to allow such robotic vehicle systems to move over such surfaces and/or obstacles. For example, biped robots such as ASIMO, BARt-UH, and QRIO, may demonstrate the capability of biped and humanoid robots for stair climbing. Further, for example, the Packbot may overcome obstacles with an additional set of tracks outside of the primary drive tracks. Still further, smaller robots can often climb stairs by "jumping" from step to step. For example, the Scout may use a small tail normally used for balance to jump autonomously up a flight of stairs. However, such previously-devised apparatus, systems, and methods may have disadvantages.

SUMMARY

The disclosure herein generally relates to robotic vehicle systems having lobed wheels and methods regarding such systems, such as, e.g., methods of movement for such robotic vehicle systems (e.g., movement across varying terrain including steps).

One exemplary embodiment of a robotic vehicle system includes a frame and at least four wheels. A first pair of the at least four wheels are rotatably coupled on opposite sides of the frame along a first axis and a second pair of the at least four wheels are rotatably coupled on opposite sides of the frame along a second axis (e.g., wherein the first axis is parallel to the second axis). Each wheel of the at least four wheels includes a hub portion and at least three surface-engaging lobe portions spaced equidistantly about the hub portion. At least each lobe portion includes a plurality of layers coupled together. Further, the hub portion is rotatably coupled to the frame to allow movement of the hub portion and the at least three lobe portions together about one of the first and second axes.

Another exemplary embodiment of a robotic vehicle system includes a frame and at least four wheels. A first pair of the at least four wheels are rotatably coupled on opposite sides of the frame along a first axis and a second pair of the at least four wheels are rotatably coupled on opposite sides of the frame along a second axis (e.g., wherein the first axis is parallel to the second axis). Each wheel of the at least four wheels includes a hub portion and at least three surface-engaging lobe portions spaced equidistantly about the hub portion. At least each lobe portion includes two or more separate materials, wherein the two or more separate materials are configured to provide flexibility to the wheel. Further, the hub portion is rotatably coupled to the frame to allow movement of the hub portion and the at least three lobe portions together about one of the first and second axes.

One exemplary embodiment of a method for controlling a robotic vehicle system to climb one or more steps includes providing a robotic vehicle system that includes a frame and at least four wheels. A first pair of the at least four wheels are rotatably coupled on opposite sides of the frame along a first axis and a second pair of the at least four wheels are rotatably coupled on opposite sides of the frame along a second axis (e.g., wherein the first axis is parallel to the second axis). Each wheel of the at least four wheels includes a hub portion and at least three surface-engaging lobe portions spaced equidistantly about the hub portion. The hub portion is rotatably coupled to the frame to allow movement of the hub portion and the at least three lobe portions together about one of the first and second axes. The method further includes locating the robotic vehicle system proximate the one or more steps, wherein a first lobe portion of the at least three lobe portions of the first pair of wheels is in contact with a surface proximate a first step of the one or more steps, rotating the first pair of wheels to contact the landing of the first step with a second lobe portion of the at least three lobe portions of the first pair of wheels, further rotating the first pair of wheels to lift the first lobe portion of the at least three lobe portions of the first pair of wheels off of the surface, and rotating the second pair of wheels to assist in moving the robotic vehicle system up the first step.

Another exemplary embodiment of a method for controlling a robotic vehicle system to traverse a surface includes providing a robotic vehicle system that includes a frame and at least four wheels. A first pair of the at least four wheels are rotatably coupled on opposite sides of the frame along a first axis and a second pair of the at least four wheels are rotatably coupled on opposite sides of the frame along a second axis (e.g., wherein the first axis is parallel to the second axis). Each wheel of the at least four wheels includes a hub portion and at least three surface-engaging lobe portions spaced equidistantly about the hub portion. The hub portion is rotatably coupled to the frame to allow movement of the hub portion and the at least three lobe portions together about one of the first and second axes. The method further includes locating the robotic vehicle system upon the surface and rotating the at least four wheels to move across the surface.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

DETAILED DESCRIPTION OF EXEMPLARY EMBODIMENTS

Figure 1:
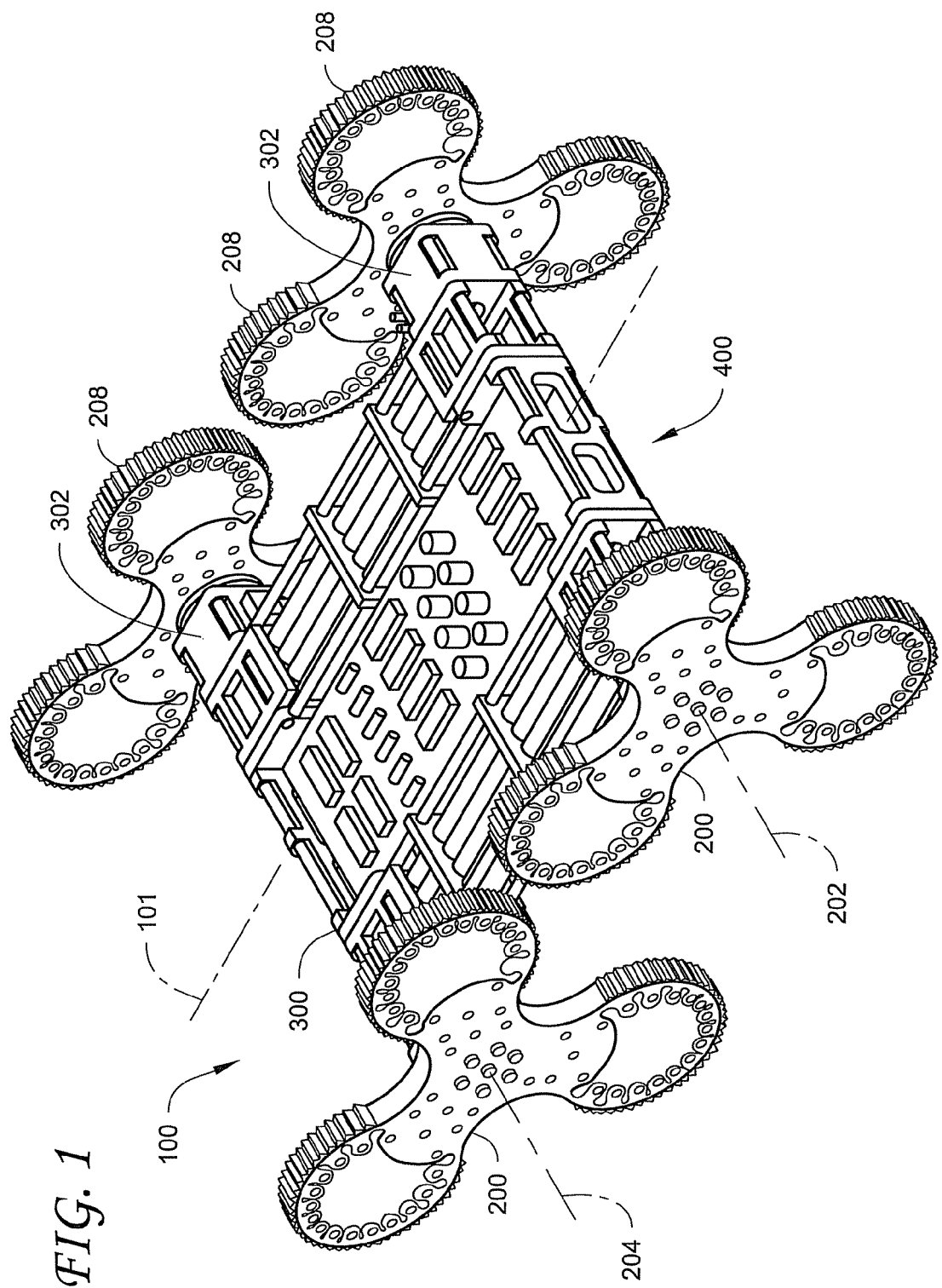
FIG. 1 is a perspective view of an exemplary embodiment of a robotic vehicle system.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary apparatus, and methods of constructing such apparatus, shall be described with reference to FIGS. 1-8. It will be apparent to one skilled in the art that elements from one embodiment may be used in combination with elements of the other embodiments, and that the possible embodiments of such apparatus using combinations of features set forth herein is not limited to the specific embodiments shown in the Figures and/or described herein. Further, it will be recognized that the embodiments described herein may include many elements that are not necessarily shown to scale. Further, it will be recognized that the size and shape of various elements herein may be modified but still fall within the scope of the present disclosure, although one or more shapes and/or sizes, or types of elements, may be advantageous over others.

As used herein, the phrase "substantially the same" may be defined as having a tolerance of less than 2 percent. For example, if two parts have substantially the same mass, the first part may have a mass within 2 percent of the second part.

Further, as used herein, the words "stairs" and "steps" may used interchangeably.

The robotic vehicle systems described herein may be versatile, rugged, and serviceable platforms for operations in demanding urban environments. Further, the robotic vehicle systems may suffer a number of tumbles and falls, and as such, the chassis and wheels may be designed to withstand drops of up to 1.5 meters or more.

One exemplary embodiment of a robotic vehicle system 100 having lobed wheels 200 is shown in FIG. 1. The robotic vehicle system 100 may include a frame 300 and four lobed wheels 200 rotatably coupled to the frame 300. Although the robotic vehicle system depicted in FIG. 1 and described herein includes four lobed wheels 200, the robotic vehicle system 100 according to the present invention may include four or more lobed wheels. In at least one embodiment, the robotic vehicle system may include a combination of lobed wheels and normal wheels. For example, the front two wheels may be lobed while the rear two wheels may be normal, round wheels. Further, in at least one embodiment, the robotic vehicle system may include less than four lobed wheels in, e.g., a three wheeled vehicle.

The lobed wheels 200 are rotatably coupled to the frame 300. In at least one embodiment, an actuator 302, e.g., an AC stepper motor, may be coupled to the frame 300, and each lobed wheel 200 may be directly coupled to a drive shaft of the actuator 302. In the embodiment depicted, each lobed wheel 200 is attached to an independent actuator 302. Further, in at least one embodiment, the lobed wheels 200 may also be rotatably coupled to the frame 300 and the actuators 302 such that the frame 300 supports at least a portion of the mass of the wheels 200 while allowing the actuators 302 to move, e.g., rotate, the wheels 200. As shown in FIG. 1, a first pair of the four lobed wheels 200 may be attached to frame along a first axis 202 and a second pair of the lobed four wheels 200 may be attached to the frame along a second axis 204 that is parallel to the first axis 202 (e.g., when the lobed wheels 200 are synchronized or in the same phase such that the frame 300 is not twisted or flexed and is lying along a plane).

Figure 2:
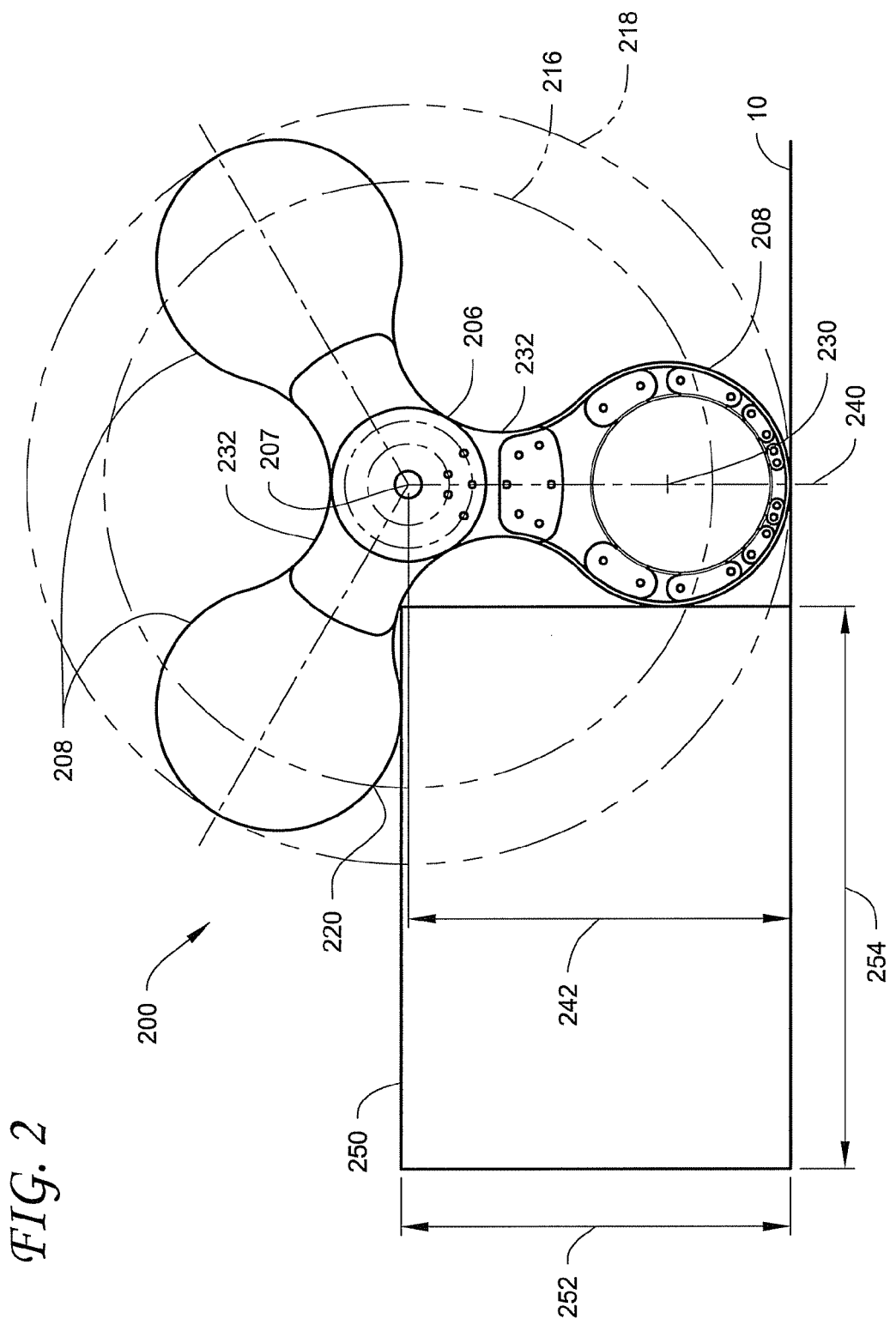
FIG. 2 is a plan view of one exemplary lobed wheel of the robotic vehicle system of FIG. 1.

Each lobed wheel 200 may have a hub portion 206 and multiple lobe portions 208 as shown, e.g., in FIG. 2. The hub portion 206 may rotatably be coupled to the frame 300 (e.g., using actuator 302) to allow movement of the hub portion 206 and lobe portions 208 together. The lobe portions 208 and the hub portion 206 are coupled such that they do not rotate separately from one another. In other words, the lobe portions 208 and hub portions 206 only rotate together. In the embodiment depicted, each lobed wheel 200 has three lobe portions 208 spaced equidistantly about the hub portion 206. However, in at least one embodiment, the lobed wheels may have three or more lobe portions spaced equidistantly about a hub portion. Still further, in at least another embodiment, the lobed wheels may include two or more different sizes of lobe portions, e.g., the smaller-sized lobe portions may be equidistantly located on or between the equidistantly spaced larger-sized lobe portions. However, the present invention will be described herein with the lobed wheels 200 having three lobe portions 208.

FIG. 2 shows a dashed inner circle 216 that is about 80 percent the diameter of the dashed outer circle 218. The intersection 220 of the dashed inner circle 216 with the lobe portions 208 when the wheel 200 is rotated as shown (i.e., with a lobe 208 perpendicular to the surface 10) may define a step height that the lobed wheel may be able to climb. Such a step height may be approximately 80 percent of the radius of the outer circle 218 (i.e., the radius of the lobed wheel 200). In one or more embodiments, the radius of the lobed wheel 200 may be 60 percent or greater of the step height and may be 120 percent or less of the step height. Further, for example, the radius of the lobed wheel may be greater than 80 percent of the step height, less than 100 percent of the step height, greater than 70 percent of the step height, and/or less than 90 percent of the step height. For example, in FIG. 2, the radius 242 of the lobed wheel 200 may be slightly smaller than about 100 percent of the step height 252 of step 250.

In one or more embodiments, the step length 254 (i.e., the landing) may be about 7 inches or greater. The step height 252 may be about 1 inch to about 12 inches.

In at least one embodiment, the lobed wheels 200 of the robotic vehicle system 100 have a diameter of at least about 9 inches, which may be at least about 2 inches taller than a standard step.

However, the robotic vehicle system 100 may climb obstacles taller than 120 percent of the wheel radius by flipping over such taller obstacles.

Figure 3:
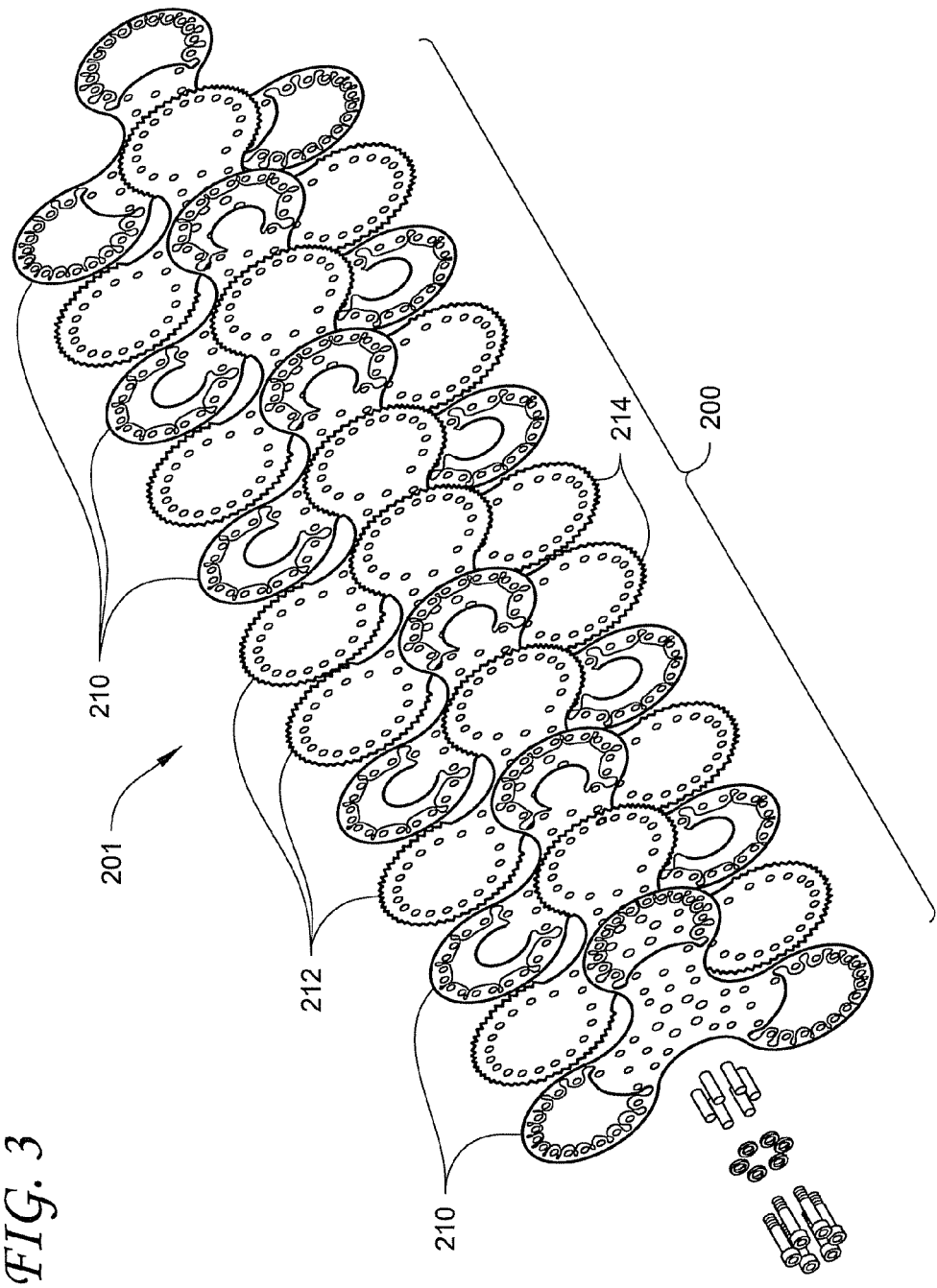
FIG. 3 is an exploded, perspective view of one exemplary lobed wheel of the robotic vehicle system of FIG. 1.
Figure 4:
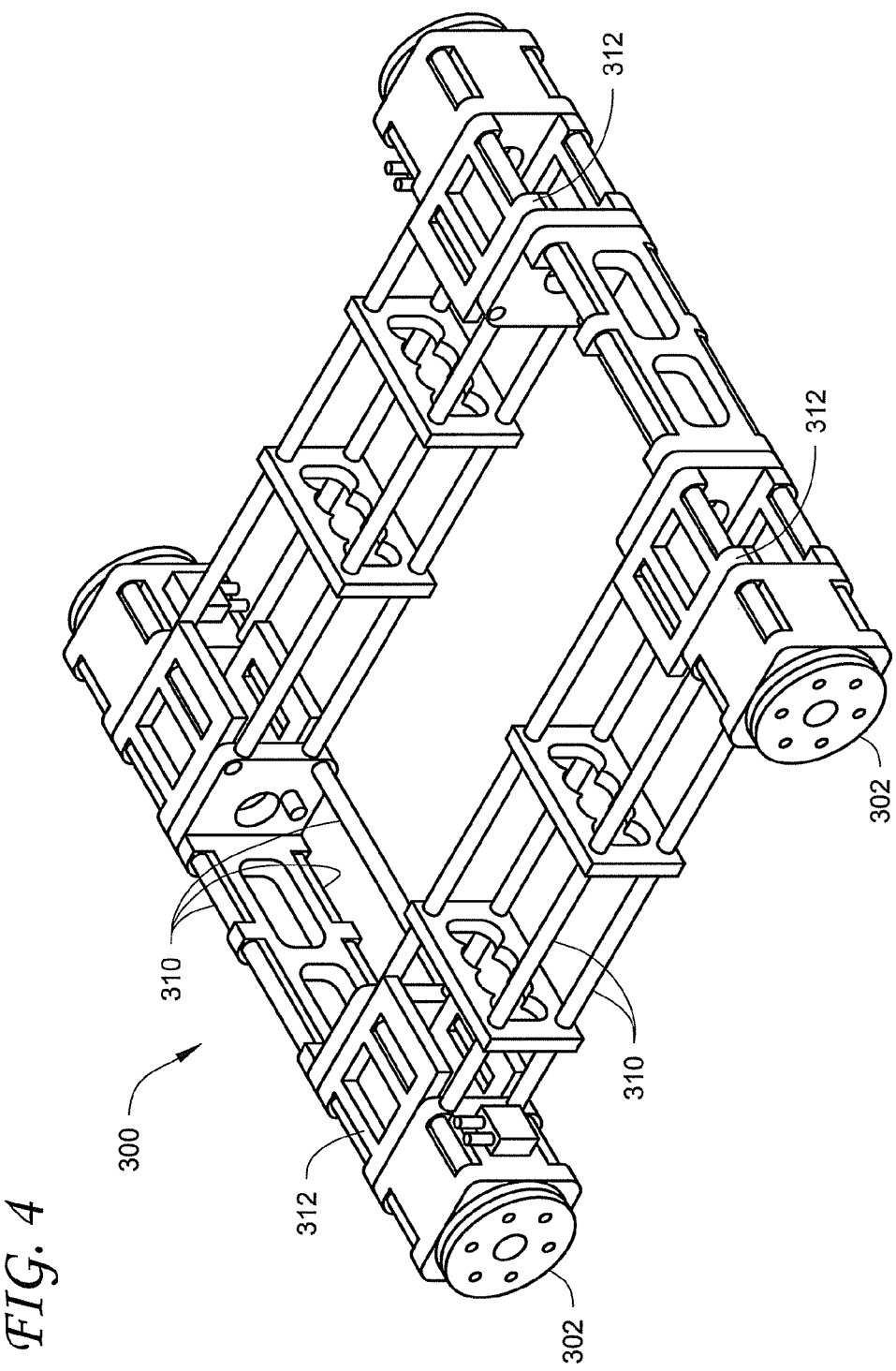
FIG. 4 is a perspective view of one exemplary frame of the robotic vehicle system of FIG. 1.

The lobed wheels 200 depicted in FIGS. 1-3 each have lobe portions 208 and a hub portion 206 that lie along a wheel plane. However, in other embodiments, portions of the wheel need not lie in the wheel plane. For example, each lobe portion may extend outwardly from the plane the hub lies along.

Further, the lobed wheels 200 may be compliant such that at least a portion of the wheels 200 may be deflected when the wheel 200 contacts a surface. For example, each lobe portion 208 of the lobed wheel 200 may lie in a plane when in a normal state, and at least a part of the lobe portion 208 may be deflected from that plane when in a stressed state (e.g., when traversing a non-planar surface). The lobed wheels 200 may not be compliant beyond a certain threshold so that the mass of the robotic vehicle system is always supported above the ground.

Still further, the lobed wheels 200 may be symmetric. For example, each lobe portion 208 of a lobed wheel 200 may be symmetric about a radial axis (e.g., axis 240). In at least one embodiment, each wheel 200 of the robotic vehicle system 100 may have substantially the same size, substantially the same shape, and/or substantially the same mass. Further, in at least one embodiment, each lobe portion 208 of a wheel 200 may have substantially the same size, substantially the same shape, and/or substantially the same mass.

Each lobe portion 208 may be defined around a center 230 offset from the center 207 of the hub. Each lobe portion 208 may define at least a 180 degree arc around such offset center 230. In the wheel 200 show in FIG. 2, the lobe portion defines about a 240 degree arc around the offset center 230 and is connected to the hub portion 206 by, e.g., a neck portion 232. Each lobe portion 208 is connected by curved portion 212 of the wheel that may, e.g., have an opposite curvature to that of the lobe portion 208. Although not required, the wheel 200 depicted in the FIGS. shows the wheel 200 having a continuous curvature around the circumference of the wheel that may resemble a sinusoidal waveform wrapped around the circumference.

The lobed wheels 200 may act as a cog when climbing a standard step (e.g., a step having a height of 20.32 centimeters and a landing of 20.48 centimeters), which may allow the robotic vehicle system 100 to climb stairs with exceptional speed. The lobed wheels 200 may be specifically sized for the anticipated range of step sizes the robotic vehicle system 100 may encounter. Further, the lobed wheels 200 may be sized to prevent the actuators 302 and frame 300 from impacting, e.g., a stair edge, while climbing. Further, the lobed wheels 200 may be designed such that they are capable of maintaining contact with step landings during climbing activity. As such, the lobed wheel 200 may be designed with specific lobe portion 208 diameters and transition angles to the hub portion 206 to maintain such constant contact with the stair landings while climbing.

The lobed wheels 200 may be formed of one or more portions (e.g., one or more layers) and one or more materials (e.g., an exemplary lobed wheel may be a single portion formed of a single material). In at least one embodiment, the lobed wheels 200 may be formed of a plurality of layers 201 coupled together as shown in FIG. 3. For example, the hub portion 206 and the lobe portions 208 may be formed of a plurality of layers 201 coupled together with one or more of the layers including at least part of the hub portion 206 and a part of each lobe portion 208 of the each lobed wheel 200. In at least one embodiment, each layer of the plurality of layers 201 may be planar. Further, in at least one embodiment, each lobe portion 208 may be formed of a separate plurality of layers. The plurality of layers 201 may be coupled together by any technique as would be know by one having ordinary skill in the art. For example, the plurality of layers 201 may be riveted together with, e.g., plastic rivets. Although riveted together, the plurality of layers 201 may move relative to one another to allow a certain degree of flexibility (e.g., up to 20 degrees deflection from a normal state such as a plane in which the lobed wheel 200 lies). Further, the layers forming each lobe portion 208 may only be riveted about the edges of the lobe portion 208 to, e.g., increase the flexibility of the lobed wheel 200. Still further, in at least one embodiment, the inner portions of the lobe portions 208 may not be coupled (e.g., riveted together).

In at least one embodiment, the plurality of layers 201 may be a plurality of support layers 210 and compliant layers 212 as depicted in FIG. 3. The support layers 210 may be formed of a polymer, e.g., polyethylene, or any other material as would be known by one having ordinary skill in the art. The compliant layers 212 may be formed of a polymer, e.g., Buta-n rubber, or any other material as would be known by one having ordinary skill in the art. In at least one embodiment, the compliant layers 212 may be larger than the support layers 210 such that the outer edges of the compliant layers 212 may function as ground-contacting surfaces 214 of the lobed wheels 208. Further, the ground-contacting surfaces 214 may include traction surfaces, e.g., notches or teeth, for potentially providing greater traction for different types of surfaces. In at least one embodiment, the ground-contacting surfaces 214 of the lobed wheels 200 may be coated by another substance, e.g., rubber, for increased traction.

Further, the support layers 210 may define openings (e.g., openings through the layer) proximate the lobe portions 208 to, e.g., provide flexibility or compliance in the lobe portions 208. For example, as shown in FIG. 3, the support layers 210 include a perimeter portion extending around the perimeter of the lobed portions 208 (e.g., proximate the ground-contracting surfaces 214 of the complaint layers 212) and defining the openings. Four of the support layers 210 (e.g., the innermost support layers 210), as shown in FIG. 3, further include stiffening tabs extending within the openings.

Further, the perimeter portions of the support layers 210 may define multiple apertures for connectors to extend therethrough to connect the plurality of layers 201 together at the perimeter of the wheel 200. The perimeter portions of the support layers 210 may further include tabs extending towards the center of the wheel 200 (e.g., the axis upon which the wheel rotates) which define the apertures for the connectors. The tabs of the support layers 210 may each define one or more apertures, which may affect the flexibility or compliance of the lobed wheel 200.

In one or more embodiments, the lobed wheels 200 may be formed of laminates of polyester film, or weave constructions with Kevlar and polythene yarns (with the proper backing).

In at least another embodiment, the lobed wheels 200 may be formed of two or more separate materials (e.g., the same or different types of materials) where such materials are configured to provide flexibility to the lobed wheels 200. For example, the two or more separate materials may move relative to one another to allow a certain degree of flexibility (e.g., up to 20 degrees deflection from a normal state such as a plane in which the wheel or lobe portion lies). In at least one embodiment, each lobe portion 208 of the lobed wheels 200 may be formed of two or more separate materials.

In at least one embodiment, the lobed wheels 200 may be constructed using alternating layers of Buna-N rubber (e.g., compliant layers 212) and ultra-high molecular weight polyethylene (e.g., support layers 210). The polyethylene layers may form the support structure for each of the lobes and may contain alternating flexures connected by shoulder bolts isolated in rubber tubes. The shoulder bolts used to mount the wheel to the motor may also be isolated from the structure using rubber tubing. The use of rubber tubes to isolate the wheel layers from the mounting hardware may provide additional compliance in the structure and may prevent damage to the polyethylene layers. Two of the polyethylene layers may also include stiffening tabs to provide lateral support to the structure. The Buna-N layers may provide protection to the polyethylene from debris and direct contact with hard surfaces extending slightly beyond the polyethylene layers to provide traction.

The robotic vehicle system 100 may include a frame 300 upon which the wheels are attached (e.g., rotatably coupled). In the embodiment depicted in FIGS. 1 and 4, the frame 300 is a rectangular shape with actuators 302 coupled to each of its four corners. The frame 300 may be compliant such that the frame 300 may be in a normal position when in a normal state, and at least a portion of the frame may be deflected from the normal position when in a stressed state. In at least one embodiment, the frame 300 may lie substantially along a plane when in a normal state, and at least a portion of the frame may be deflected from the plane when in stressed state. In at least one embodiment, the deflected portion of the frame may be deflected about 20 degrees or more. In at least another embodiment, the deflected portion of the frame may be deflected about 30 degrees or less.

The frame 300 may be formed of individual rods 310 (e.g., separated from one another, lying parallel to each other, located on two or more or all dies of the frame 300, etc.) connected by various support structures 312. The individual rods 310 may be formed of metal, e.g., tool steel. The various support structures 312 may be formed of a polymer, e.g., polyethylene. The combination of the individual rods 310 and the various support structures 312 may provide the flexibility and/or compliance of the frame 300. For example, such combination may provide the frame 300 with enough compliancy such that the frame 300 may partially absorb undesired motion but resilient enough to carry its weight and to allow the vehicle 100 to master a variety of terrains (e.g., compliant across the longitudinal axis 101, one or more latitudinal axes parallel to axis 202 or 204, and/or any other lines extending through the frame 300 in any direction). Further, for example, such a combination may create a highly compliant structure capable to bend and flex to keep the lobed wheels 200 in contact with a ground surface.

The frame 300 may further include portions designed to hold various pieces of the robotic vehicle system 100 including, e.g., batteries, sensors, etc. and portions designed to protect the various pieces of the system 100, e.g., ground-contacting plates, additional plating, skin, etc.

As shown in FIG. 1, a control system 400 (described in further detail herein) may be suspended from a support structure or structures, e.g., an aluminum plate, in the center of the frame 300 and may be isolated from undesired motion, e.g., shock, by rubber bushings.

Each of the actuators 302 may be connected by one or more of the rods 310 (e.g., three parallel rods) to allow for compliance, e.g., twist, between the left and right sides of the frame 300.

The robotic vehicle system 100 may include a control system 400 electrically coupled to the actuators 302 to, e.g., individually control each actuator 302, and powered by a power source 402, e.g., batteries, attached to the frame 300. The control system 400 may further monitor each actuator 302 to determine, e.g., the position of each wheel 200, the torque being applied to each wheel 200, etc.

In at least one embodiment, the components of the control system 400 may be symmetrically arranged about the robotic vehicle system 100. For example, the components may be symmetrically located about axis 101 extending through the center of the robotic vehicle system 100 and spaced equidistantly between the left and the right side (or the front and the back side) of the robotic vehicle system 100 (see, e.g., FIG. 1).

Figure 5:
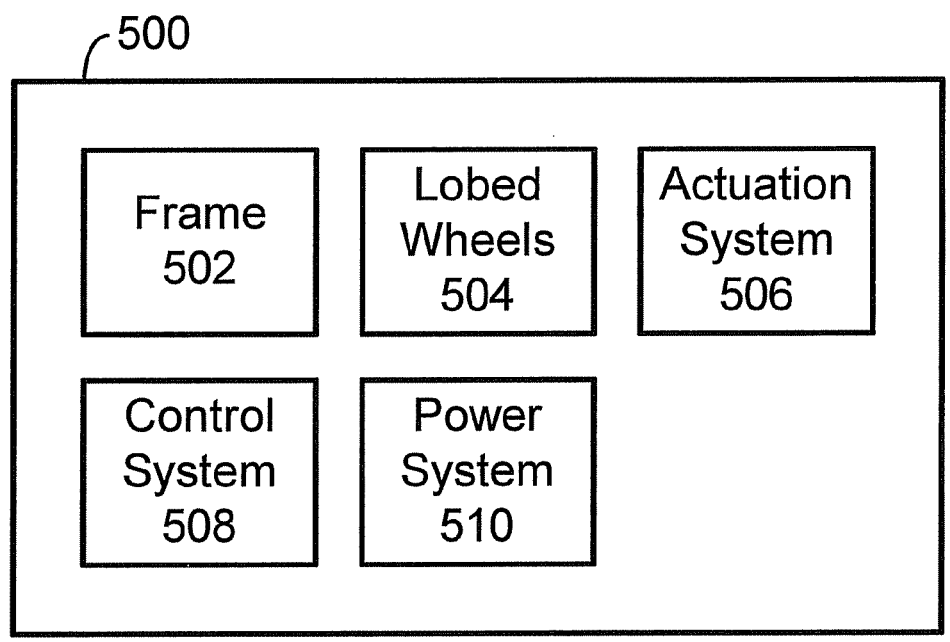
FIG. 5 is a diagrammatic view of an exemplary robotic vehicle system.

A robotic vehicle system 500 is diagrammatically represented in FIG. 5. The robotic vehicle system 500 includes a frame 502, one or more lobed wheels 504, an actuation system 506, a control system 508, and a power system 510. The frame 502 and wheels 504 may be substantially similar to the frame 300 and lobed wheels 200 described herein with references to FIGS. 1-4. As such, for simplicity, further description on such features is not further provided.

The actuation system 506 of the robotic vehicle system 500 may include one or more actuation mechanisms, electrical circuits, and circuit devices (e.g., controllers) that may assist in moving any portion of the robotic vehicle system 500. For example, the actuation system 506 may include one or more actuators (e.g., the actuators 302 of the robotic vehicles system 100) to drive the one or more lobed wheels 504 of the robotic vehicles system 500. Further, for example, the actuation system 506 may include actuators for moving or opening grasping arms, cameras, lights, microphones, etc. Further, the actuation system 506 may include specific electrical circuits and/or controllers for driving and monitoring the one or more actuators.

Figure 6:
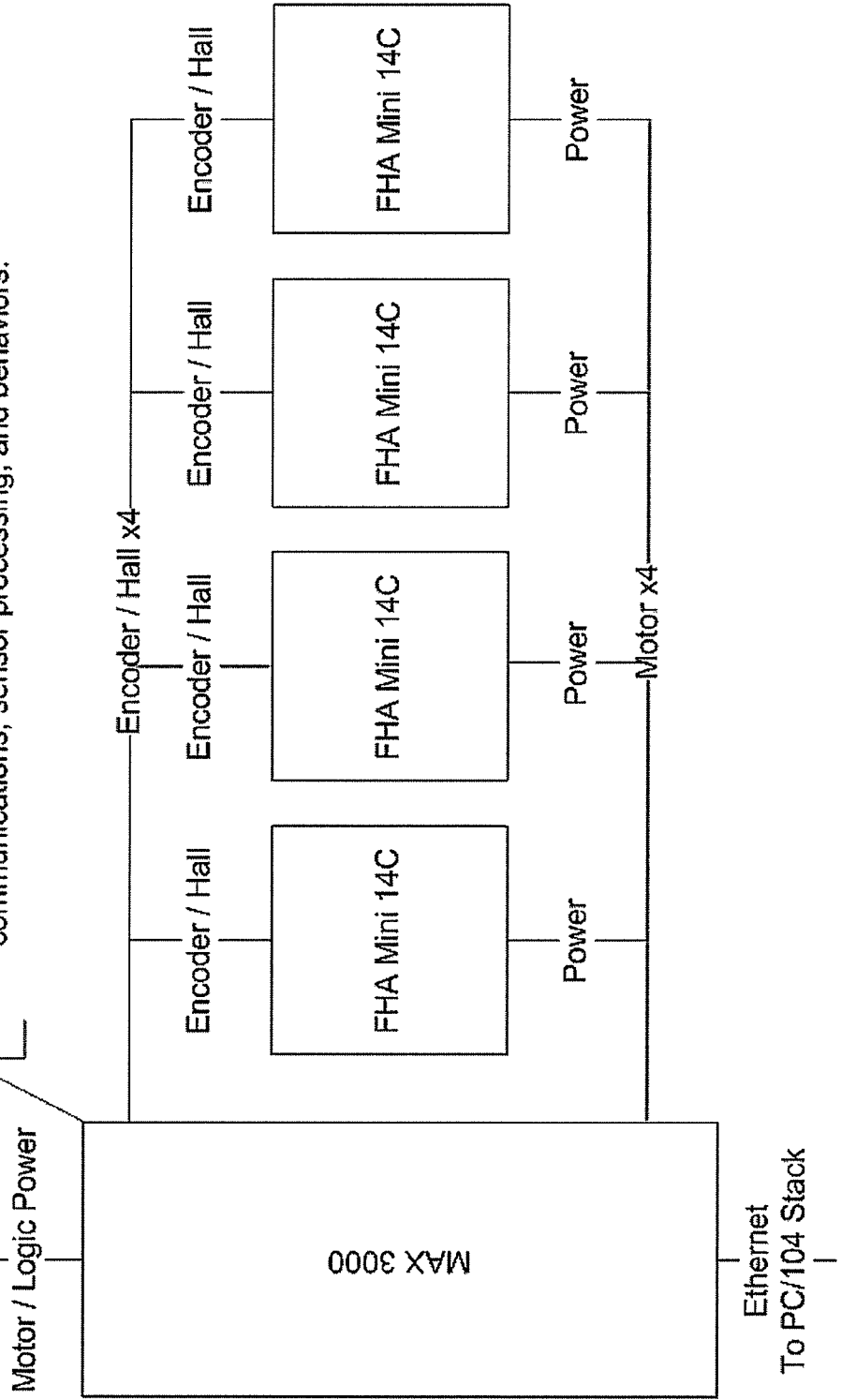
FIG. 6 is a diagrammatic view of one exemplary control system of the robotic vehicle system of FIG. 5.

One exemplary actuation system 600 is depicted diagrammatically in FIG. 6. The actuation system 600 may include a motion controller (e.g., a MAX 3000 programmable logic device, a dedicated digital signal processor, etc.) that may allow many of the motion tasks to be offloaded from the control system 508, freeing additional resources on the control system 508 for higher level control tasks and sensor processing. Further, the actuation system 600 includes four actuators (e.g., FHA Mini 14C Servo Actuators or any stepper, brushed, or brushless motors or actuators) electrically coupled to the motion controller. In at least one embodiment, the actuators may be driven 24 volts with a peek current capability of 15 amps.

The control system 508 of the robotic vehicle system 500 may include one or more electrical circuits and circuit devices (e.g., controllers) that may assist in any functionality of the robotic vehicle system 500. For example, the control system 508 may be programmed to control the various methods of movement described herein (e.g., movement up stairs, movement along a surface, etc.). Further, for example, the control system 508 may include electrical circuitry and/or circuit devices to provide remote control functionality to allow a user to control the system 500 from a remote location or to capture and transmit images from the robotic vehicle system 500. Still further, for example, the control system 508 may provide any input/output data communication functionality through a wired and/or wireless connection.

Figure 7:
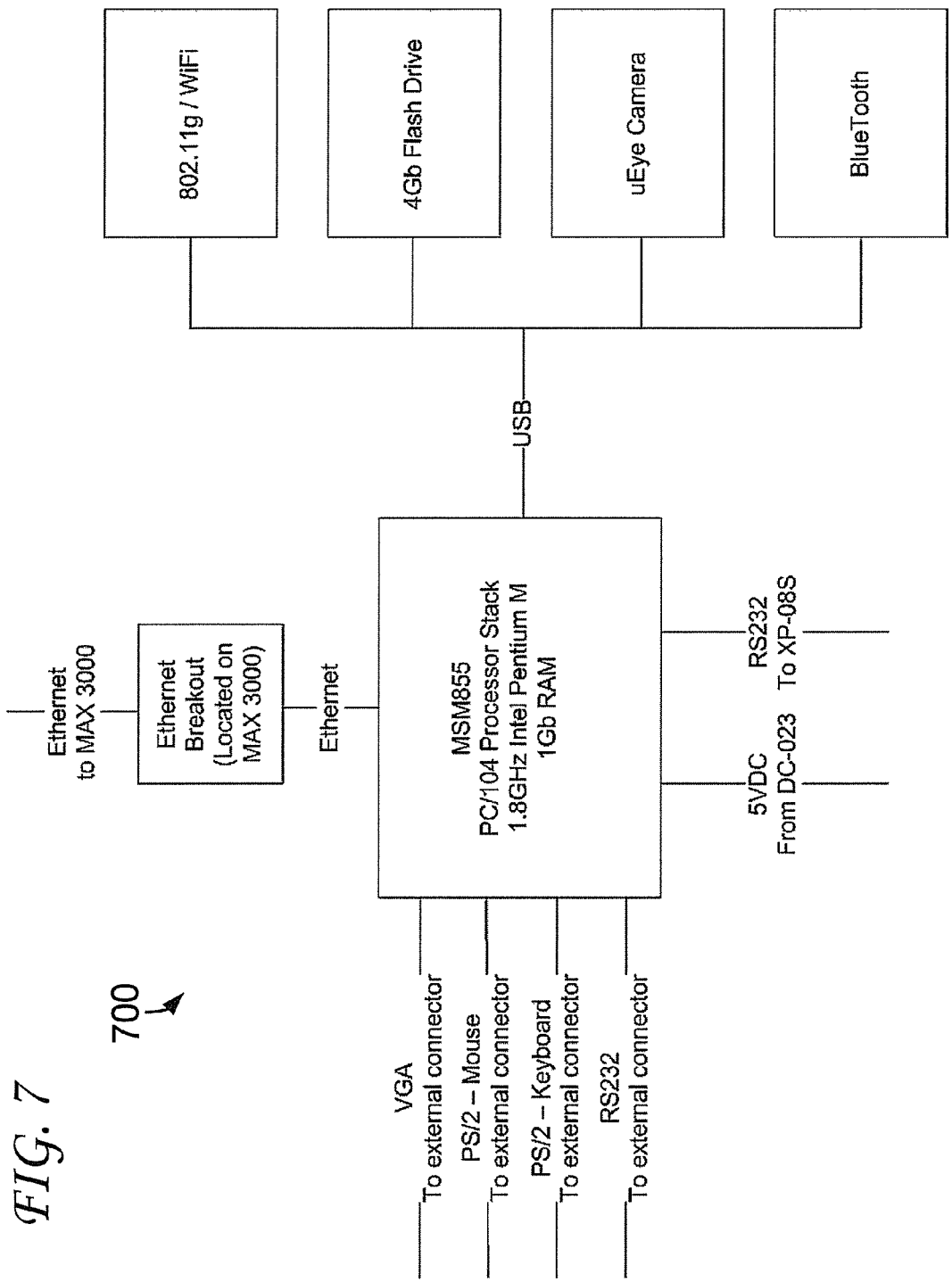
FIG. 7 is a diagrammatic view of one exemplary control system of the robotic vehicle system of FIG. 5.

One exemplary control system 700 is depicted diagrammatically in FIG. 7. The control system 700 includes a Pentium M computer running Debian GNU/Linux and may include input/output capabilities such as an Ethernet (e.g., for communicating with the motion controller), RS232 (Serial Port), PS/2, VGA monitor connection, IEEE 802.11g (Wi-Fi), Universal Serial Bus (USB), and/or IEEE 802.15.1 (Bluetooth). Further, a flash drive may be used as the boot device and as a mass storage device for data collection.

The power system 510 of the robotic vehicle system 500 may include one or more power sources, electrical circuits, and circuit devices that may assist in providing power to any portion of the robotic vehicle system 500. The power sources may be, e.g., one or more batteries, and the electrical circuits may provide power from the power sources to the actuation system 506 and/or control system 508. Further, the circuit devices of the power system 510 may provide the functionality to control the power system 510 to, e.g., recharge the power sources, switch power sources, balance the power sources, etc. Still further, the circuit devices may provide visual feedback (e.g., using a liquid crystal display) to indicate the present capacity of the power sources, etc.

Figure 8:
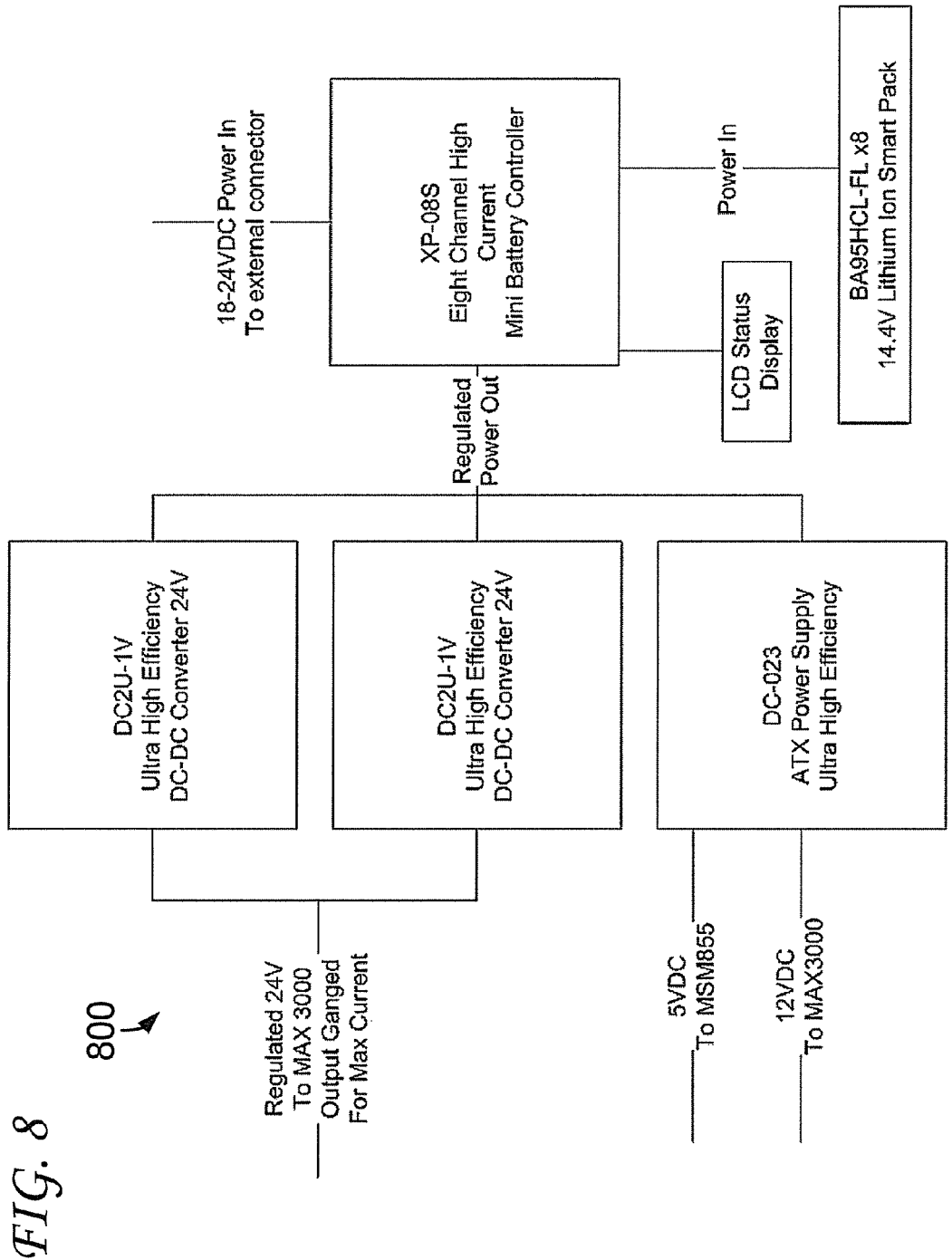
FIG. 8 is a diagrammatic view of one exemplary power system of the robotic vehicle system of FIG. 5.

One exemplary power system 800 is depicted diagrammatically in FIG. 8. The power system 800 may include one or more electrical circuits and/or controllers so as to provide the power levels required for the other sub-systems. Further, the power system 800 may provide status information on an external liquid crystal display (LCD) and to the control system through a serial connection. The power system 800 may also balance the load on the lithium-ion smart batteries and may handle the tasks associated with charging such batteries.

In at least one embodiment, the power system 800 as shown in FIG. 8 may include eight lithium-ion smart batteries, a management module, and 3.3, 5, 12, and 24 volt DC-to-DC power supplies. With each actuator of the actuation system 506 capable of pulling as much as 15 amps at 24 volts or 360 watts in one embodiment, the power system 800 may be able to handle high current at high discharge rates. The average power consumption during normal walking may be approximately 72 watts per motor resulting in 288 watts of continuous power draw while moving. Each actuator may be capable of drawing a peak power of 360 watts for up to two minutes. In one embodiment, the robotic vehicle system 500 includes a 24 volt power system 800 that may provide a peak power of 480 watts continuously. Further, the eight lithium-ion smart batteries may be rated at 95 watt hours for a total available power of 760 watt hours.

The robotic vehicle system 100 may have multiple methods of movement. One such method of movement may include climbing movement, and another such method of movement may include walking movement. Further, the robotic vehicle system 100 may be designed to traverse surfaces including stairs, undulations, inclines, declines, holes, carpet, hardwood, tile, concrete, grass, dirt, gravel, rock, etc.

In at least one embodiment, the robotic vehicle system 100 may use specific gaits and may monitor the orientation (e.g., the rotation) of the wheels 200. Exact positioning of each wheel 200 may be handled by a motion controller with encoder feedback (e.g., feedback at 400,000 counts per revolution). Further, many of the gaits for specific motion may also be programmed into the actuation system. As used herein, "gait" may be defined as a manner of moving.

A method for controlling a robotic vehicle system to climb one or more steps may include locating the robotic vehicle system proximate one or more steps. The first lobe portion of the at least three lobe portions of the first pair of wheels may be in contact with a surface proximate a first step of the one or more steps. The first pair of wheels may be rotated to contact the landing of the first step with a second lobe portion of the at least three lobe portions of the first pair of wheels. The first pair of wheels may be rotated to lift the first lobe portion of the at least three lobe portions of the first pair of wheels off of the surface. Further, the second pair of wheels may be rotated to assist in moving the robotic vehicle system up the first step.

The front pair of wheels and the rear pair of wheels may further be rotated as described herein to climb more steps. For example, the first pair of wheels may be further rotated to contact the landing of a second step with a third lobe portion of the at least three lobe portions of the first pair of wheels. Next, the first pair of wheels may be further rotated to lift the second lobe portion of the at least three lobe portions of the first pair of wheels off of the landing of the first step.

The phase between the wheels of the robotic vehicle system may be modified depending on the different characteristics of the stairs. "Phase" may be defined as a particular point within a cycle, e.g., the rotation of a wheel. As such, when two wheels are "in phase" with each other, each of the wheels is rotating such that the same portion of each of wheels passes a particular point of rotation (e.g., 25 degrees) at the same time. In at least one embodiment, the first pair of wheels and the second pair of wheels are rotated in phase with each other. In another embodiment, the first pair of wheels is rotated in phase with each other, and the second pair of wheels is rotated in phase with each other, wherein the first pair of wheels is out of phase with the second pair of wheels.

The rotation of each wheel of the robotic vehicle system may be monitored. As a result of this monitoring and/or other monitoring (e.g., from additional sensors such as inertial measurement units described herein), the rotation of the wheels may be adjusted. For example, the robotic vehicle system may monitor the rotation of the first pair of wheels and the rotation of the second pair of wheels, and adjust the rotation of the second pair of wheels in response to the rotation of the first pair of wheels. Further, for example, the robotic vehicle system may monitor the rotation of the at least four wheels individually, and adjust the rotation of each of the at least four wheels individually in response to the individual rotation of the at least four wheels. Still further, for example, the robotic vehicle system may monitor the rotation of at least one wheel of the at least four wheels, and adjust the rotation of at least one wheel of the at least four wheels (e.g., the same monitored wheel or another) in response to the monitored rotation of the at least one wheel of the at least four wheels.

The robotic vehicle system may further adjust the phase between the first pair of wheels and the second pair of wheels to match a period between adjacent steps of the one or more steps.

In at least one embodiment, climbing may be accomplished with the front left wheel and front right wheel in phase with each other and the back left wheel and back right wheel in phase with each other. However, the phase variation between the front wheels and back wheels may be dependent on the period of the stairs, i.e., the distance between the leading edge of adjacent stairs. In at least one embodiment, the robotic vehicle system may include at least one sensor capable of determining the optimal phase offset between the front and rear wheels. As such, the platform may approach the stairs with all four wheels in phase, and when the climbing activity starts, the rear wheels may result in an error, which may be ignored, and the electrical current, may be set such that the rear wheels only hold the position of the rear section of the robotic vehicle system. Then, the front wheels may pull the robotic vehicle system up the stairs and the rear wheels may follow as the load decreases and may hold position as the load increases. In at least one embodiment, the phase between the front wheels and rear wheels may be allowed to naturally match the period of the stairs being climbed.

In at least one embodiment, the robotic vehicle system can reliably climb stairs at a rate of two stairs per second. With stairs having a period close to that of the robotic vehicle system's length (i.e., the distance between the first axis and the second axis) and a good initial alignment, the robotic vehicle system may climb at a rate of at least three stairs per second. Further, the cog-like nature of the wheels may provide the robotic vehicle system with the capability of self aligning with the stairs. Self alignment may occur with an initial alignment as high as fifteen degrees from perpendicular (i.e., fifteen degrees between a line extending perpendicular to the leading edge of one of the stairs and a longitudinal axis through the center of the robotic vehicle system).

In at least one embodiment, the robotic vehicle system may use inertial monitoring units (IMUs) to estimate if a wheel is in contact with a stair landing or edge. The data from the IMUs may be fed directly to the motion controller allowing rapid response to situations that could result in wheel slip or the robotic vehicle system tipping.

A method for controlling a robotic vehicle system to traverse a surface may include locating the robotic vehicle system on a surface and merely rotating the at least four wheels to move across the surface. Various phase configurations between each wheel may exhibit advantages for different modes of operation and/or different types of surfaces that the robotic vehicle system may traverse. In at least one embodiment, the four wheels may merely be rotated in phase with each other. Further, in at least another embodiment, one or more of the four wheels may be rotated out of phase with one or more other wheels of the four wheels. Still further, in at least another embodiment, the first pair of wheels may be rotated in phase with each other, and the second pair of wheels may be rotated in phase with each other, wherein the first pair of wheels is out of phase with the second pair of wheels.

Yet still further, a first wheel of the first pair of wheels may be rotated in phase with a first wheel of the second pair of wheels, wherein the first wheel of the first pair of wheels and the first wheel of the second pair of wheels are rotatably coupled to the frame on opposite sides. A second wheel of the first pair of wheels may be rotated in phase with a second wheel of the second pair of wheels, wherein the second wheel of the first pair of wheels and the second wheel of the second pair of wheels are rotatably coupled to the frame on opposite sides, and wherein the first wheel of the first pair of wheels is out of phase with the second wheel of the first pair of wheels. Yet still further, in at least one embodiment, two wheels of the at least four wheels may be rotated as a function of a sinusoidal waveform.

Although many different phase configurations are described herein, each lobed wheel of the robotic vehicle system may be independently controlled/driven, and therefore, the robotic vehicle system may utilize any phase configuration between such lobed wheels as would be beneficial.

As described herein, monitoring the rotation of the wheels may be beneficial. In at least one embodiment, the robotic vehicle system may monitor the rotation of the wheels, and adjust the rotation to decrease the time the lobes of each of the wheels are out of contact with the surface. Further, in at least one embodiment, the robotic vehicle system may monitor the rotation of the first pair of wheels and the rotation of the second pair of wheels, and adjust the rotation of the second pair of wheels in response to the rotation of the first pair of wheels. Still further, in at least one embodiment, the robotic vehicle system may monitor the rotation of the wheels individually, and adjust the rotation of each of the wheels individually in response to the monitored individual rotation of the wheels.

In at least one embodiment, the ideal walking gait for the robotic vehicle system may be a nominal alternating diagonal gait whereby the front left wheel is in phase with the back right wheel and the front right wheel is in phase with the back left wheel. Further, each wheel may be driven so that it may be out of contact with the ground for the shortest period of time possible. This functionality may be acquired by accelerating each wheel when it is not in contact with the ground and decelerating each wheel before contacting the ground to match the current desired speed. The lobed wheel design combined with this gait may only cause the axel to deflect 13 percent as opposed to an axel deflection of 41 percent when the wheels are in phase.

In at least one embodiment, forward and backward motion may be achieved by maintaining a constant phase relationship for all four wheels. To maintain a constant phase relationship, small adjustments may be made by the motion controller to the actuators. However, in at least one embodiment, the alternating diagonal gait has been shown to provide stable motion at speeds of up to 88.9 centimeters or 1.81 body lengths per second. This speed was achieved using open-loop control. The speed may have been limited by the stress on the motors of the wheel lobe portions impacting the ground. A closed-loop control may overcome this limitation.

In at least one embodiment, movement with all four wheels in phase may be stable at speeds of not more than 73.6 centimeters or 1.45 body lengths per second. At greater speeds, the simultaneous impact of all four wheels may cause a hopping motion and may lead to instability in the gait. As discussed herein, the implementation of a gait that minimizes the time a lobe portion is not in contact with the ground may improve the robotic vehicle system's performance. Motion of this type may require that the motion controller predict when a lobe portion has lost contact with a surface. Such a predictive algorithm should be achievable given the torque, following error, and position data that may be available in the motion controller. Once contact with a surface is lost, the motion controller may use a sinusoidal acceleration profile to reach some maximum velocity or middle position between lobe portions. An opposite acceleration profile may then be used to return the wheel to the proper forward velocity before the lobe portion contacts the surface again. Motion of this type may improve the speed of the robotic vehicle system without increasing instability.

Multiple methods of turning have been implemented with the robotic vehicle system according to the present invention. In at least one embodiment, the robotic vehicle system may turn in place by rotating the wheels at a constant velocity but in opposite direction on the opposite sides of the robotic vehicle system. In at least another embodiment, the robotic vehicle system may make gradual turns while moving forward or backwards by slowing the rotation of the wheels on one side of the robotic vehicle system. The robotic vehicle system may further implement any vehicular turning system and/or method as known by one having ordinary skill in the art.

Any features, components, and/or properties of any of the embodiments described herein may be incorporated into any other embodiment(s) described herein.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the apparatus and methods described herein. Various modifications of the illustrative embodiments, as well as additional embodiments of the disclosure, will be apparent upon reference to this description.

What is claimed is:

1. A robotic vehicle system comprising:
   a frame; and
   at least four wheels, wherein a first pair of the at least four wheels are rotatably coupled on opposite sides of the frame along a first axis and a second pair of the at least four wheels are rotatably coupled on opposite sides of the frame along a second axis, and further wherein each wheel of the at least four wheels comprises:
   a hub portion, and
   at least three surface-engaging lobe portions spaced equidistantly about the hub portion, wherein at least each lobe portion comprises a plurality of layers coupled together, wherein each of the at least three lobe portions terminates in a continuous curvature, and further wherein the hub portion is rotatably coupled to the frame to allow movement of the hub portion and the at least three lobe portions together about one of the first and second axes.

2. The robotic vehicle system of claim 1, wherein each lobe portion of the at least three lobe portions is symmetric about a radial axis extending orthogonally from one of the first and second axes.

3. The robotic vehicle system of claim 1, wherein the system further comprises:
   at least four actuators, wherein each actuator is coupled to a corresponding hub portion of one of the at least four wheels and coupled to the frame to provide movement of the corresponding hub portion about one of the first and second axis; and
   a control system electrically coupled to the at least four actuators to individually control each actuator.

4. The robotic vehicle system of claim 1, wherein the frame is compliant such that the frame is in a first position when in a normal state, and at least a portion of the frame may be deflected from the first position when in a stressed state.

5. The robotic vehicle system of claim 1, wherein the curvature of each of the at least three lobe portions is the same.

6. The robotic vehicle system of 1, wherein the at least three lobe portions lie in a plane orthogonal to one of the first and second axis when in a normal state, and further wherein at least a part of at least one of the at least three lobe portions is deflected from the plane when in a stressed state.

7. The robotic vehicle system of claim 1, wherein the hub portion and the at least three lobe portions of each wheel comprise a plurality of layers coupled together with one or more of the plurality of layers comprising at least a part of the hub portion and a part of each lobe portion of the wheel.

8. The robotic vehicle system of claim 1, wherein the plurality of layers comprises alternating support layers and compliant layers.

9. The robotic vehicle system of claim 8, wherein the support layers comprise a polymer.

10. The robotic vehicle system of claim 8, wherein the compliant layers comprise a polymer.

11. A method for controlling a robotic vehicle system to climb one or more steps, wherein each step of the one or more steps comprises a landing, the method comprising:
   providing a robotic vehicle system, the robotic vehicle system comprising:
   a frame, and
   at least four wheels, wherein a first pair of the at least four wheels are rotatably coupled on opposite sides of the frame along a first axis and a second pair of the at least four wheels are rotatably coupled on opposite sides of the frame along a second axis, and further wherein each wheel of the at least four wheels comprises:
   a hub portion, and
   at least three surface-engaging lobe portions spaced equidistantly about the hub portion, wherein each of the at least three lobe portions terminates in a continuous curvature, wherein the hub portion is rotatably coupled to the frame to allow movement of the hub portion and the at least three lobe portions together about one of the first and second axes;
   locating the robotic vehicle system proximate the one or more steps, wherein a first lobe portion of the at least three lobe portions of the first pair of wheels is in contact with a surface proximate a first step of the one or more steps;
   rotating the first pair of wheels to contact the landing of the first step with a second lobe portion of the at least three lobe portions of the first pair of wheels;
   further rotating the first pair of wheels to lift the first lobe portion of the at least three lobe portions of the first pair of wheels off of the surface; and
   rotating the second pair of wheels to assist in moving the robotic vehicle system up the first step.

12. The method of claim 11, wherein the method further comprises:
   rotating the first pair of wheels to contact the landing of a second step with a third lobe portion of the at least three lobe portions of the first pair of wheels; and
   further rotating the first pair of wheels to lift the second lobe portion of the at least three lobe portions of the first pair of wheels off of the landing of the first step.

13. The method of claim 11, wherein the at least each lobe portion of each wheel of the at least four wheels of the robotic vehicle system comprises a plurality of layers coupled together.

14. The method of claim 11, wherein the first pair of wheels are rotated in phase with each other, and the second pair of wheels are rotated in phase with each other, wherein the first pair of wheels are out of phase with the second pair of wheels.

15. The method of claim 11, the method further comprising:
   monitoring the rotation of each wheel of the at least four wheels individually; and
   adjusting the rotation of at least one wheel of the at least four wheels in response to the individual rotations of at least one wheel of the at least four wheels.

16. The method of claim 11, the method further comprising adjusting the phase between the first pair of wheels and the second pair of wheels to match a period between adjacent steps of the one or more steps.

17. A method for controlling a robotic vehicle system to traverse a surface, the method comprising:
   providing a robotic vehicle system, the robotic vehicle system comprising:
   a frame, and
   at least four wheels, wherein a first pair of the at least four wheels are rotatably coupled on opposite sides of the frame along a first axis and a second pair of the at least four wheels are rotatably coupled on opposite sides of the frame along a second axis, and further wherein each wheel of the at least four wheels comprises:
   a hub portion, and at least three surface-engaging lobe portions spaced equidistantly about the hub portion, wherein each of the at least three lobe portions terminates in a continuous curvature, wherein the hub portion is rotatably coupled to the frame to allow movement of the hub portion and the at least three lobe portions together about one of the first and second axes;

locating the robotic vehicle system upon the surface; and rotating the at least four wheels to move across the surface.

18. The method of claim 17, wherein rotating the at least four wheels comprises:

rotating a first wheel of the first pair of wheels in phase with a first wheel of the second pair of wheels, wherein the first wheel of the first pair of wheels and the first wheel of the second pair of wheels are rotatably coupled to the frame on opposite sides; and rotating a second wheel of the first pair of wheels in phase with a second wheel of the second pair of wheels, wherein the second wheel of the first pair of wheels and the second wheel of the second pair of wheels are rotatably coupled to the frame on opposite sides, wherein the first wheel of the first pair of wheels is out of phase with the second wheel of the first pair of wheels.

19. The method of claim 17, wherein rotating the at least four wheels comprises rotating a first wheel of the first pair of wheels and a first wheel of the second pair of wheels in phase with each other, wherein the first wheel of the first pair of wheels and the first wheel of the second pair of wheels are rotatably coupled to the frame on the same side.

20. The method of claim 17, the method further comprising:

monitoring the rotation of each wheel of the at least four wheels individually; and adjusting the rotation of at least one wheel of the at least four wheels individually in response to the monitored individual rotation of at least one wheel of the at least four wheels.

* * * * *